United States Patent [19]

Stall et al.

[11] Patent Number: 5,783,131
[45] Date of Patent: Jul. 21, 1998

[54] METHOD TO SLOWLY REGENERATE CELLULOSIC SAUSAGE CASING

[75] Inventors: Alan David Stall, Naperville, Ill.; Luis Michelena Garcia, Madrid, Spain

[73] Assignee: Alfacel s.a., Madrid, Spain

[21] Appl. No.: 703,888

[22] Filed: Aug. 27, 1996

[51] Int. Cl.$^6$ .................................................. C08B 16/00
[52] U.S. Cl. .......................... 264/196; 264/209.1; 425/68
[58] Field of Search ..................... 264/178 R, 181, 264/187, 188, 189, 192, 196, 209.1; 425/68

[56] References Cited

U.S. PATENT DOCUMENTS

| | | |
|---|---|---|
| 604,206 | 6/1898 | Cross et al. . |
| 1,036,282 | 2/1912 | Lilienfeld . |
| 1,070,776 | 8/1913 | Cohoe et al. . |
| 1,158,400 | 10/1915 | Cohoe . |
| 1,163,740 | 12/1915 | Cohoe . |
| 1,601,686 | 9/1926 | Henderson . |
| 1,612,508 | 12/1926 | Henderson et al. . |
| 1,645,050 | 10/1927 | Henderson . |
| 1,654,253 | 12/1927 | Henderson . |
| 1,873,685 | 8/1932 | Voss et al. . |
| 1,898,400 | 2/1933 | Schnecko et al. . |
| 1,937,225 | 11/1933 | Hewitt . |
| 1,942,990 | 1/1934 | Voss . |
| 1,997,349 | 4/1935 | Schwalbe et al. . |
| 2,013,491 | 9/1935 | Freund . |
| 2,032,171 | 2/1936 | Hewitt . |
| 2,043,172 | 6/1936 | Hewitt . |
| 2,043,455 | 6/1936 | Voss et al. . |
| 2,070,247 | 2/1937 | Weingand et al. . |
| 2,141,776 | 12/1938 | Vautier et al. . |
| 2,176,925 | 10/1939 | Reichel et al. . |
| 2,271,932 | 2/1942 | Atkinson . |
| 2,275,348 | 3/1942 | Charch et al. . |
| 2,592,355 | 4/1952 | Tachikawa . |
| 2,962,766 | 12/1960 | Hinkle et al. ........................... 425/68 |
| 2,999,756 | 9/1961 | Shiner et al. . |
| 2,999,757 | 9/1961 | Shiner et al. . |
| 3,044,115 | 7/1962 | Craver et al. ........................... 425/68 |
| 3,124,631 | 3/1964 | Davis et al. ............................ 264/181 |
| 3,139,467 | 6/1964 | Drisch et al. ........................... 264/198 |
| 3,758,458 | 9/1973 | Dyer . |
| 3,835,113 | 9/1974 | Burke et al. . |
| 4,159,299 | 6/1979 | Serkov et al. .......................... 264/180 |
| 4,590,107 | 5/1986 | Bridgeford ............................... 428/36 |
| 4,778,639 | 10/1988 | Jon et al. ................................ 264/190 |
| 5,277,857 | 1/1994 | Nicholson et al. ..................... 264/187 |
| 5,358,765 | 10/1994 | Markulin ............................... 428/34.8 |
| 5,403,530 | 4/1995 | Taylor .................................... 264/203 |

FOREIGN PATENT DOCUMENTS

| | | |
|---|---|---|
| 463402 | 12/1913 | France . |
| 1220601 | 3/1986 | U.S.S.R. . |
| 1496744 | 7/1989 | U.S.S.R. . |
| 1692488 | 11/1991 | U.S.S.R. . |
| 408774 | 4/1934 | United Kingdom . |

OTHER PUBLICATIONS

Krassig, et al., "Cellulose" Ullmann's Encyclopedia of Industrial Chemistry, Fith, Completely Revised Edition, vol. A5:375–415.

H. de Leeuw, "Technologie Chimique et Physique", Les Soies Artificielles, Librairie Polytechnique ch. Beranger, Paris, 1932, pp. 312–317.

*Primary Examiner*—Mathieu D. Vargot
*Attorney, Agent, or Firm*—Marshall, O'Toole, Gerstein, Murray & Borun

[57] ABSTRACT

The present invention relates to an improved method for regenerating cellulosic sausage casings which includes the steps of extruding viscose through an annular extrusion die submerged in an aquarium to form a tubular product and partially gelling and coagulating the gel tubing in the aquarium, supporting the partially gelled and coagulated tubing on at least two upwardly moving inclined belt such that different sides of the casing are disposed in an upward facing orientation on the different belts and applying an intermediate regenerating solution to the tubing supported by the belts until it is partially cured, and conveying the partially cured tubing into at least one coagulation/regeneration bath which completes regeneration of the tubing.

13 Claims, 4 Drawing Sheets

METHOD TO SLOWLY REGENERATE CELLULOSIC SAUSAGE CASING

BACKGROUND OF THE INVENTION

This invention relates to provision of a new, unique regeneration method for accurate extrusion at high speeds, of tubular non-fibrous, non-reinforced, regenerated cellulosic casing, normally referred to as skinless sausage casing.

Tubular cellulosic casing is well-known and has been widely used for many years by numerous manufacturers. The basic process for manufacturing regenerated cellulosic casings is through the well-known viscose process which creates a liquified colloidal dispersion of cellulose fibers in an alkaline liquid carrier. Viscose is described in English Patent 8700, Cross, Bevan and Beadle. Patents such as U.S. Pat. No. 1,036,282 to Lilienfield redefine the compositions. U.S. Pat. No. 1,070,776; U.S. Pat. No. 1,158,400; U.S. Pat. No. 1,163,740 to Cohoe and Fox describe use of viscose to manufacture a tubular cellulosic casing. Henderson provides basic technology to manufacture viscose into tubular casings with regenerating baths touching the inner and outer surfaces of the tube: U.S. Pat. No. 1,601,686; U.S. Pat. No. 1,612,508; U.S. Pat. No. 1,645,050; U.S. Pat. No. 1,654,253.

Specific details for manufacture of modern day casings from viscose into regenerated cellulose are well known in the art and are described in references such as U.S. Pat. Nos. 2,999,756 and 2,999,757 to Shiner; U.S. Pat. No. 3,835,113 to Burke; U.S. Pat. No. 4,590,107 to Bridgeford; U.S. Pat. No. 4,778,639 to Jon; and U.S. Pat. No. 5,358,765 to Markulin. These references describe the basic process of extruding viscose (sodium cellulose xanthate, sodium hydroxide, water) through an annular die into a coagulating and regenerating bath which regenerates the extruded viscose to produce a cellulosic tubular casing.

A critical aspect in the manufacture of the cellulosic casing is the rapidity of conversion of the liquified viscose back into regenerated cellulose using such coagulating and regenerating baths. A very detailed chemical discussion of viscose regeneration is included in *Physics and Chemistry of Cellulose Fibres* by Hendrik Petrus Hermans, Elsevier Publishing Company, 1949. Hermans describes use of a regenerating bath of 9% $H_2SO_4$ (sulfuric acid, 22% $Na_2SO_4$ (sodium sulfate salt), into which the viscose is cast to regenerate it back into cellulose. The necessity for the right salt concentration is critical since the salt allows the viscose first to gelatinize before the NaOH (sodium hydroxide) in the viscose can react with the sulfuric acid to decompose the xanthate molecule back into cellulose and water. The sodium sulfate retards the sulfuric acid H ion penetration into the viscose, slowing down acid reaction.

The degree of viscose regeneration back into cellulose can be visually determined throughout the regeneration process according to the following: (1) within the aquarium the viscose/casing is brown and is still a fresh weak gel and is characterized by a pH of above 7; (2) at the aquarium exit, the viscose/casing turns yellow and is characterized by increased strength and a pH below 7; (3) upon further regeneration after exiting acid wash tubs, the casing turns white indicating a pH between 2 and 4 and that all NaOH in viscose is exhausted, $CS_2$ and sodium sulphate are now in the casing; (4) after exiting the wash tubs but before glycerination, the casing turns clear indicating that all $CS_2$ has been washed out of the casing, and pH returns to the 6.5 to 7.0 range.

Hermans also provides a detailed description of the means to raise strength in regenerated cellulosic products, including raising the final degree of polymerization of the product, and raising the cellulose composition of the viscose. Both options, however, will increase the viscosity of the viscose, making it harder to extrude and handle.

Patents such as Henderson 1,601,686 clearly describe higher viscosity viscose (i.e. higher degree of polymerization of viscose) as fundamental to increasing casing strength. Related patent to Tachikawa, U.S. Pat. No. 2,592,355 and Dyer U.S. Pat. No. 3,758,458 describe methods for making high degree of polymerization (DP) viscoses to increase strength.

Patents such as Hewitt U.S. Pat. No. 1,937,225 describe the evolution of gas during the conversion of viscose into cellulose, where the evolved gas is trapped inside the tubular casing and must be vented by puncturing the casing to release the gas. Hewitt teaches increasing cab heights to distribute the gas for puncturing. Hewitt also teaches slow regeneration in order to distribute the gas throughout the process, allowing more volume for a fixed gas quantity, and therefore longer times between casing punctures. Hewitt suggests the use of lower $H_2SO_4$ concentrations in the regenerating bath to slow the regeneration process. In contrast, Freund in U.S. Pat. No. 2,013,491, teaches that regeneration be accelerated and that regeneration take place in a long vertical tank. Such a tank allows easy escape of the internal gas through the drain in the extrusion nozzle attached to the vertical aquaria tank.

Atkinson, in U.S. Pat. No. 2,271,932 shows longer residence time from the aquarium exit to the first tub after the aquaria. The residence time allows more gas and liquid to run back through the nozzle attached to the aquaria. In addition, this method allows the casing to cool. Atkinson indicates the desirability of imparting some machine direction stretch after complete regeneration to strengthen the casing. Specifically, Atkinson teaches imparting a longitudinal stretch of from 5% to 70%.

Shiner in U.S. Pat. Nos. 2,999,756 and 2,999,757 describes imparting a traverse orientation after full regeneration to strengthen and orient the casing, with minor machine direction orientation. Burke, in U.S. Pat. No. 3,835,113 advises that tubular casing strength will be 20,000 to 25,000 psi dry, 3,000 to 4,000 psi when fully wetted.

Bridgeford in U.S. Pat. No. 4,590,107 discloses the use of slow regeneration. Typical prior art methods using "normal" regeneration speeds utilized regeneration bath (Muller bath) temperatures of 40° C. to 46° C. and sodium sulfate concentrations of 150 to 250 g/liter sodium sulfate and sulfuric acid concentrations of 50 g/liter to 135 g/liter. Such methods resulted in casing having a degree of polymerization (DP) of about 450 to 750. In contrast, Bridgeford teaches a "slow" regeneration utilizing a regenerating bath of 28° C. to 34° C. temperature, with sulfuric acid concentration of 100 to 120 g/liter and an increased sodium sulfate concentration of 250 g/liter to 280 g/liter. Each of these three changes made by Bridgeford dramatically slows down the regeneration rate, which Bridgeford found made a stronger casing. The strength came by increasing casing density to 1.46 to 1.53 grams per cubic centimeter (g/cc) range, versus prior art of 1.37 g/cc to 1.40 g/cc range. Extrusion rates were disclosed to be 110 to 150 feet per minute (34 to 46 meters per minute). Casings produced by the method of Bridgeford were reported to have equivalent or superior tensile strengths and physical properties compared to those of prior art regenerated at a "conventional" regeneration speed. Similar approaches were used in the production of rayon viscose such as disclosed in U.S. Pat. No. 3,139,467.

Nevertheless, the method described in Bridgeford, U.S. Pat. No. 4,590,107 for producing an increased strength casing was never successfully commercialized. This is because conventional extrusion systems subject partially regenerated casing, which has just exited from the aquarium, to a long vertical travel path. (See FIG. 1.) The casing typically has 20 to 30 seconds residence time from exiting the aquaria to reaching the first tub in the final regenerating and wash sequence. Bridgeford describes this first tub as a wash water tub, 25° C., subsequently followed by regeneration bath tubs and then finally a heated countercurrent water wash system of tubs at 35° to 60° C. During the period between the time the casing leaves the aquarium exit and enters the first tub which is a water wash tub, several steps can take place. The casing can cool down and internal liquids can drain back into the aquaria, up to the top turnaround in the travel path. Past the top turnaround, liquid and gas can be collected in the travel path downwards to extend the time between punctures. In this region, acid sprays can be applied to enhance the casings regeneration as shown in U.K. Patent 408,774 and U.S. Pat. Nos. 2,043,455, 2,070,247, 2,176,925 and 2,275,348.

FIG. 1 shows the predominant technology employed in different embodiments by the major skinless cellulose casing producers. The casing must be sufficiently regenerated leaving the aquaria to be strong enough to withstand the tensions placed on it during its uphill travel in the tower. The first roll encountered exiting the aquaria is commonly called the premier roll (18), which is typically 1 to 3 meters above the aquaria to allow sufficient dwell time for casing solidification prior to its contacting the roll.

Nevertheless, if the viscose/casing exiting the aquaria is not sufficiently regenerated, the casing is too weak and brittle, and the casing cannot properly survive the vertical travel in the tower. Also, it is desirable that gases which evolve from the casing during regeneration, especially $CS_2$ and $H_2S$, will evolve early in the regeneration stage so they can be vented back through the nozzle and drain, thereby lengthening the puncture interval. Slow regeneration converts much of the viscose to $CS_2$ later in the travel path, and if the conversion is carried out past the top point (22) of FIG. 1, these gases will be trapped by the casing causing the need to puncture more frequently to promote venting of the gases. Bridgeford forces these gases to be regenerated later in the process, thereby reducing the time between punctures. For these reasons, the slow regeneration method described by Bridgeford has limited commercial utility.

The use of belts for supporting viscose during its regeneration is known to the art, especially in cellophane manufacture. H. de Leewin W. Sois Artificielles, Librairie Polytechnique ch. Beranget, Paris, 1932 and French Patent No. 463,402 disclose the regeneration of viscose on belts passing through one or more regeneration baths. U.K. Patent 408, 774 describes a method to regenerate cellulose tubes using a driven belt initially to contact the tubing as it exits the regenerating bath, and then apply gentle sprays of regenerating fluid to it to regenerate it, traveling through a first trough which is slightly upwardly inclined path enroute to a second slightly upwardly inclined trough where the casing is sprayed with water, further washing the casing. The patent teaches that the casing travels in a straight line, without bends through both the regeneration and wash troughs. Similar methods have been practiced in the art such as those wherein casing exited the aquaria at a pH between 8 and 9 and was deposited on a belt where it was subjected to treatment by spraying (or dripping) first with regeneration fluid and then hot water to regenerate the viscose to about pH 5. Such methods did not have bends to the casing travel path and applied regeneration fluid to only one side of the casing.

SUMMARY OF THE INVENTION

The present invention provides an improved method for the slow regeneration of viscose sausage casings from a pH above 7 where viscose is liquified and its formation is reversible to a pH below 7 where the viscose coagulates irreversibly. While conventional processes rapidly regenerate viscose casings such that viscose extruded in aquaria at pHs above 7 are cured to pHs below 7 in about thirty seconds or less, the methods of the invention are capable of delaying regeneration of extruded viscose from a pH of greater than 7 to a pH less than 7 for greater than a minute and for as many as two or three minutes. The slow regeneration of viscose according to the methods of the invention provides casings characterized by increased density and strength.

Specifically, the present invention provides an improvement in methods for producing tubular sausage casings of regenerated cellulose wherein viscose is extruded through an annular extrusion die submerged in an aquarium to form a tubular product and coagulation and regeneration of the tubular product is initiated in said aquarium and completed in one or more coagulation/regeneration baths, the improvement comprising partially gelling and coagulating the extruded gel tubing in the aquarium to an initial level of regeneration characterized by a pH greater than 7 and preferably from pH 8.0 to pH 9.5 with a pH of about 9.0 being most preferred; supporting the partially gelled and coagulated tubing on at least two upwardly moving inclined belts such that different sides of the casing are disposed in an upward facing orientation on said different belts and applying an intermediate regenerating solution to said tubing while it is supported by said belts until it is cured to an intermediate level of regeneration characterized by a pH greater than 7 and preferably from pH 7.0 to pH 8.5 with a pH of about 7.5 being most preferred, prior to completion of regeneration in said coagulation/regeneration bath where the viscose is cured to a level of regeneration characterized by a pH less than 7. The final bath completing regeneration of the tubing, according to this method, is typically maintained at 35° C. and has a sulfuric acid concentration of about 3 gm/100 mL although multiple baths having differing sulfuric acid concentrations may also be used.

The method of the invention provides a stronger, denser casing characterized by a higher degree of polymerization of cellulose in the casing and a higher viscose concentration in the extruded viscose. The method provides for slower regeneration of viscose wherein the initial regeneration bath in the aquarium is characterized by a lower sulfuric acid concentration than is typical of prior art methods. The initial regeneration bath is also characterized by a lower temperature and higher regeneration salt concentration than used in conventional prior art regeneration baths.

According to the invention, the extruded viscose is characterized by the ability to accommodate increases in NaOH concentration if desired. While viscose produced by conventional systems is generally characterized by a NaOH concentration of 6.0 to 6.3%, the method of the invention provides for viscose having a NaOH concentration of from 6.3 to 6.7%. Thus, the greater NaOH content of the viscose used according to the methods of the invention acts to slow down the regeneration reaction by consuming more $H_2SO_4$ from the regeneration bath before allowing the xanthate molecule to decompose. The method of the invention also provides for an increase in the on-line index of viscose (a higher Hottenroth Index which means higher gamma number wherein the gamma number is the industry standard for the degree of $CS_2$ evolution). The Hottenroth Test is an industry recognized standard using $NH_4Cl$ titration of viscose to determine its reactivity, thus predicting the ease of regeneration. While conventional methods produce viscose characterized by on-line Hottenroth index numbers of from 7 to 9, the methods of the present invention provide produce viscose characterized by on-line index Hottenroth index numbers of from 11 or 12.

The method of the invention further provides for reduced $CS_2$ usage which further results in a reduction in the total sulfur content of the viscose. In addition, the method provides for casings having a transverse direction tensile strength in excess of 25,000 psi as measured by means of a tensile strength tester such as manufactured by Instron. Moreover, the slow regeneration method allows higher extrusion and line speeds in excess of 55 and even 60 meters per minute.

According to preferred methods of practice of the invention, the aquarium contains regenerating fluid characterized by a sulfuric acid concentration of from 50 to 100 grams per liter with 80 grams per liter being preferred and a sodium sulfate concentration of from about 200 to 300 grams per liter with a range of 250 grams per liter being preferred. Further, according to preferred methods, the intermediate regenerating solution is characterized by a sulfuric acid concentration of about 35 to 70 grams per liter with 50 grams per liter being preferred and a sodium sulfate concentration of about 150 to 250 grams per liter with 200 grams per liter being preferred.

The invention provides for support of the weakly regenerated tubing on two or more upwardly moving inclined belts which are arranged such that different sides of the casing are disposed in an upward facing orientation on the different belts. In this manner, the regenerating tubing may be more evenly contacted with the intermediate regenerating spray. According to a preferred embodiment of the invention, three belts are used to support the regenerating tubing in a manner such that the time of upward exposure of the two opposite sides of the flattened casing are equal. Nevertheless, it is within the skill of those in the art given the present disclosure to utilize different numbers of belts.

According to one preferred aspect of the invention, the machine direction orientation may be imparted to the casing through stretching in the machine direction before the casing reaches the chilled water tub. One particularly preferred means for doing so is a double S wrap draw roll system such as that disclosed by Atkinson U.S. Pat. No. 2,271,932, the disclosure of which is hereby incorporated by reference. The double S wrap causes a final machine direction (MD) tension to be imparted into the casing to counteract the high shrinkage which occurs from slow regeneration on the belts resulting in machine direction tensile strength in excess of 35,000 psi. According to a preferred method, the double S wrap system helps to ensure that the casing is characterized by about a 7% machine direction stretch between the aquarium and the first regeneration tub so as to provide desirable mechanical properties for meat stuffing and avoid undesirable characteristics such as the production of bullet shaped wieners.

DETAILED DESCRIPTION

Figure 1:
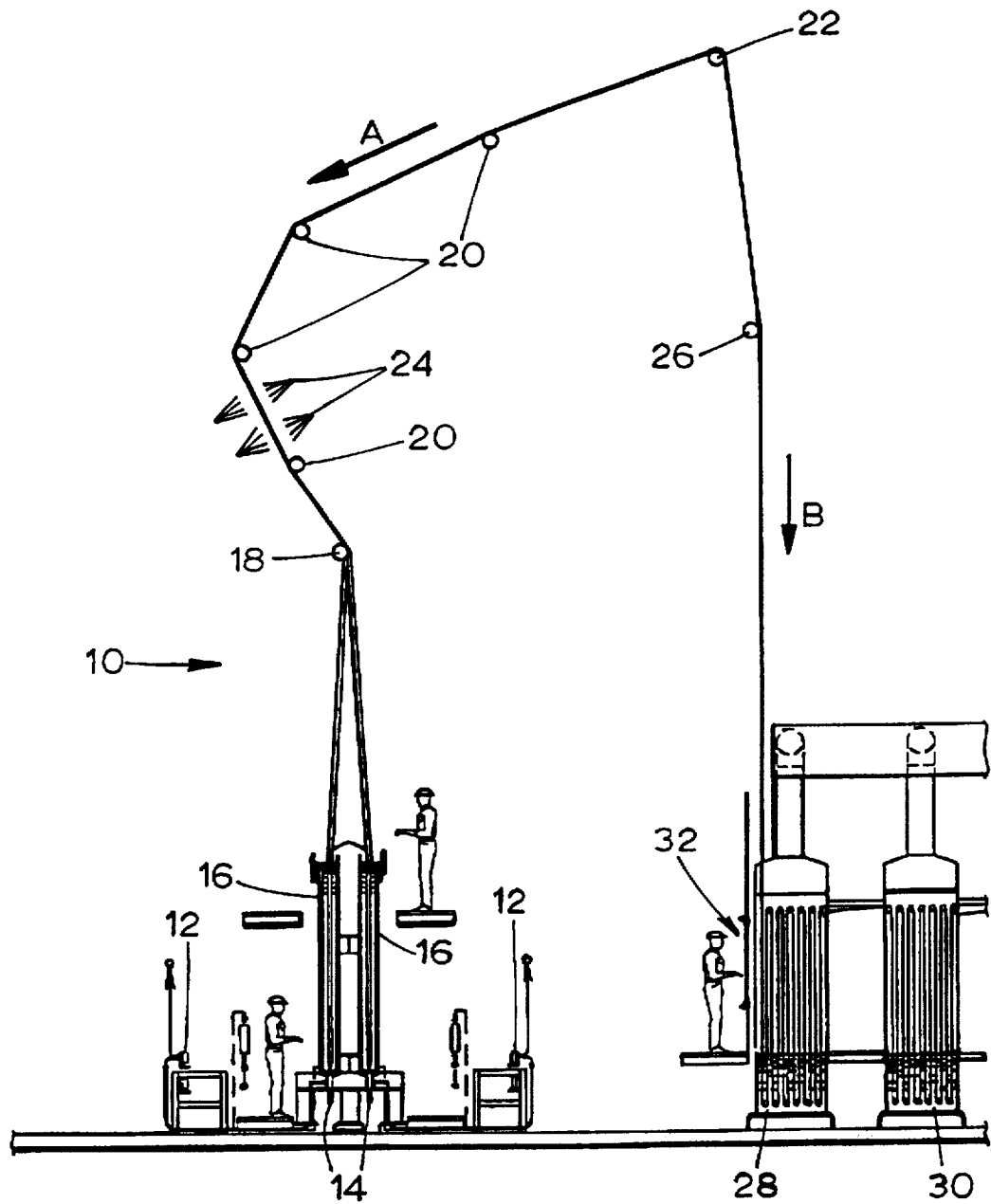
FIG. 1 depicts a generalized casing regeneration apparatus according to the prior art.

Viscose solutions preferred for use according to the invention are characterized by a cellulose concentration of from about 7.3% to about 8.0% and by a NaOH concentration of from about 6.3% to about 6.7% and preferably have a total sulfur content of about 2%. Viscose is extruded through an annular die according to conventional methods but is extruded into an aquarium containing a coagulation/regeneration fluid at 36° C., characterized by a sulfuric acid concentration of from 50 to 100 grams per liter with 80 grams per liter being preferred and a sodium sulfate concentration of from about 200 to 300 grams per liter with 250 grams per liter being preferred. The aquarium bath is capable of inducing an initial level of regeneration in the viscose characterized by a pH greater than 7 with a pH of from 8.0 to 9.5 being preferred and a pH of 9.0 being particularly preferred. This level of regeneration is less than that of conventional prior art methods which typically regenerate the viscose to a lower pH closer to pH 7 and results in a partially gelled and regenerated casing characterized by a lower tensile strength and diminished physical properties compared with casings exiting the aquarium according to other conventional methods.

This level of regeneration is critical to providing the improved properties of the present invention because it has been found that conventional, more rapid, regeneration of the viscose produces larger bubbles of $H_2S$ and $CS_2$ gas. Such large bubbles exiting the casing while the viscose is coagulating into a gel result in permanent voids and intersticial openings. This hinders future hydrogen bond cross-linking of the cellulose, thereby permanently reducing the density and strength of the casing. In the past, when lower aquaria bath temperatures or concentrations have been tested, viscose density and strength have increased due to reduced gas evolution. However, in these prior art cases, when the gas evolves later in the process, the time between puncturing the casing is greatly reduced thus limiting the practical utility of these methods.

The slow regeneration method of the invention provides further advantages in that it allows a high viscosity viscose to be used. Whereas normal viscoses have a viscosity of about 200 falling ball seconds measured with a ⅛ inch diameter ball at 20° C., with a 20 cm distance between measuring lines (about 20,000 to 25,000 centipoise) at extrusion, a viscose of 300 falling ball seconds can be used (over 30,000 centipoise). Consequently, a casing can consistently be made with degree of polymerization between 700 and 750. Alternatively, a higher cellulose content can be used in the viscose to also obtain higher strengths. According to prior art methods, cellulose contents for skinless casing viscose in excess of the normal range of 7.3% to 7.7% cellulose content tended to be characterized by boardy casing properties. Surprisingly, the invention provides for the use of cellulose contents of 8% and more which increases both viscosity and strength without imparting the undesirable characteristics typically produced by the high cellulose compositions of the prior art.

The method of the present invention allows the casing to be weakly regenerated leaving the aquaria such that it is characterized by a dark brown color and a pH greater than 7 and preferably about pH 9.0, and gradually turn yellow over a travel of approximately 36 meters, or double the normal travel path of conventional systems. As such, speeds in excess of 55 and even 60 meters per minute can be obtained while producing casings with physical properties comparable to those of conventionally produced casings produced at lower line speeds.

According to practice of the methods of the invention, the casing does not take a "permanent" crystalline set in the aquaria, with gases evolving, leaving large voids and lower density. Specifically, the casing exits the aquaria as a brown amorphous semi-solid gel, and in this fragile state, is gently led through the tower section on conveyors, remaining on these conveyors until regeneration has been slowly completed. While the casing is then slowly regenerated on the conveyors, the gases evolve very slowly, as small microbubbles. The casing interstices open up to pass the bubbles, but can reshrink and close again afterwards because sufficient crystallinity was imparted in the aquaria to allow the cellulose to have the chance for high cross-linking. The casing is therefore not subjected to violent gas evolution, and the density is considerably higher than previous technology, in excess of 1.6 g/cc. The casing is extremely strong and thin. It is far more economical to manufacture and allows use of lower thicknesses. The casing is more tolerant of subsequent mechanical damage during shirring and stuffing with meat paste.

When the prior art practiced spraying of regenerating tubing, it was done to augment regeneration which had already substantially occurred in the aquaria as evidenced by the pH of the exiting casing and further completed that regeneration as rapidly as possible. The art taught rapid regeneration in order to quickly provide a strong casing that could withstand the stress of travel over the casing tower path. In contrast to such prior art methods, the method of the invention practices spraying equally top and bottom, but does not complete regeneration which does not occur until the casing enters a series of regeneration tubs which cure the viscose to a pH less than 7.

After exiting the aquarium, the partially regenerated casing is conveyed vertically to a premier roll and then to a three level belt system making up the casing transfer conveyor. Specifically, the casing is placed onto a first upwardly moving inclined belt which supports the fragile partially regenerated casing while transporting it upward in a manner allowing gases and internal fluids to drain downwards toward the aquarium. At the same time, an intermediate regenerating solution is applied to the belt supported casing by means of sprayers disposed above the inclined belt to slowly continue the regeneration process and cool the casing. The intermediate regeneration fluid is generally characterized by concentrations of $H_2SO_4$ and $Na_2SO_4$, lower than those of the aquarium regenerating bath. Specifically, as it travels on the belt, it is sprayed with cold regenerating bath approximately 50 g/liter $H_2SO_4$ and 200 g/liter $Na_2SO_4$. The casing completes regenerating to a yellow color, requiring a total of 30 seconds to generate a yellow color (low pH) in the invention, versus prior art where the casing had a substantial yellow color exiting the aquaria, which required 4 seconds to develop. The intermediate regenerating solution is preferably applied at a temperature between 30° C. and 50° C. with a temperature of about 40° C. being preferred. The intermediate regenerating solution is preferably applied at a volume of about 100 cubic centimeters per casing, (i.e., about 8 linear meters).

According to a preferred aspect of the invention, the conveyors are fully enclosed in removable fiberglass panels. Inside the conveyors are banks of spray nozzles to spray regenerating acid onto the casing. Additionally, automatically every few hours, hot water showers the enclosures to wash away any salt crystals which collect on the belts.

The intermediate regenerating solution is preferably directed to the aquarium bath after it has been applied to the casings upon the inclined belts. Specifically, it is preferably collected in catch pans as it runs off of the belts and is combined with the regenerating bath in the aquarium. According to one embodiment of the invention, the regenerating bath of the aquarium may be diluted with water to produce the intermediate regeneration solution spray.

According to preferred methods of practicing the invention, each portion of the casing surface receives equal contact by the intermediate regeneration solution spray by alternating sides of the casing exposed to the spray on the two or more inclined belts. Specifically, the casing which is laid flat on a first inclined belt is turned over onto its opposite side when transferred onto the second belt. This alternating process may be continued along successive belts to assure that the casing surface is evenly treated with the intermediate regeneration solution. For example, where an odd number of inclined belts are used, the length of belt(s) disposing casings in one direction may be designed to equal the length of belt(s) disposing the casings in the opposite direction to provide for equal exposure of all sides of the casings to the intermediate regeneration solution.

After exiting the uppermost regeneration belt, the casing is transported downward along a long vertical leg toward one or more coagulation/regeneration baths which function to complete regeneration. During this downpath, gases and liquids which have evolved during regeneration can be collected in a large volume. Also, optionally during the downpath, the casing can have machine direction orientation imparted before the final regeneration baths by a double S wrap draw roll system such as that disclosed by Atkinson U.S. Pat. No. 2,271,932 which stretches the casing viscose to make up for excess shrinkage occurring on the belt portion of the regeneration apparatus.

According to the invention, complete regeneration of the casing does not occur until entry into a cooled water tub and a series of additional tubs containing regeneration fluid. The initial cooled water tub preferably contains about 0.5% $H_2SO_4$ derived from fugitive runoff of the regeneration fluids. According to one embodiment, six subsequent regeneration tubs preferably contain regeneration fluid having sulfuric acid concentrations as follows: Tub 1, 1–3 g/100 mL; Tub 2, 5–7 g/100 mL; Tub 3, 8–11 g/100 mL; Tub 4, 5–7 g/100 mL; Tub 5, 1–3 g/100 mL; and Tub 6, 0.5–1 g/100 mL.

FIG. 1 presents a general depiction of a casing regeneration apparatus according to methods of the prior art. The apparatus of the prior art, as well as that of the invention, generally exists as batteries of identical equipment disposed in multiples rows and even two or more columns in order to efficiently utilize resources and personnel and to maximize output. In general, therefore, the following description will be directed to a single line of viscose casing production even if the figures depict multiple echelons of production equipment as it is used commercially. FIG. 1 depicts a generalized viscose casing regeneration apparatus according to the prior art (10) comprising a viscose pump (12) for extruding viscose solution through an annular die (14) at the bottom of an aquarium (16) to form a cylindrical casing. The viscose is regenerated within the aquarium (16) and is guided vertically to a premier roll (18) which is typically one to three meters above the aquarium to allow sufficient dwell time for casing solidification prior to contact with the roll. The casing is then subsequently guided to additional rolls (20) prior to reaching the top roll (22). Cooling and/or regenerating sprays (24) may optionally directed to the casing during its upward movement. During the course of the upward travel of the casing and prior to reaching the top roll (22), liquids are able to flow downward toward the aquarium in the direction of arrow (A). Upon reaching the top roll (22), the casing is then guided downwardly over one or more optional rolls (26) to chilled water bath (28) and from there to one or more acid regenerating baths (30). During the course of the downward movement of the casing after reaching the top roll (22), gases and liquids are able to flow downward toward the chilled water bath (28) in the direction of arrow (B). In order that those liquids and gases be released from the interior of the casing, workers periodically puncture the casing at location (32).

Figure 2:
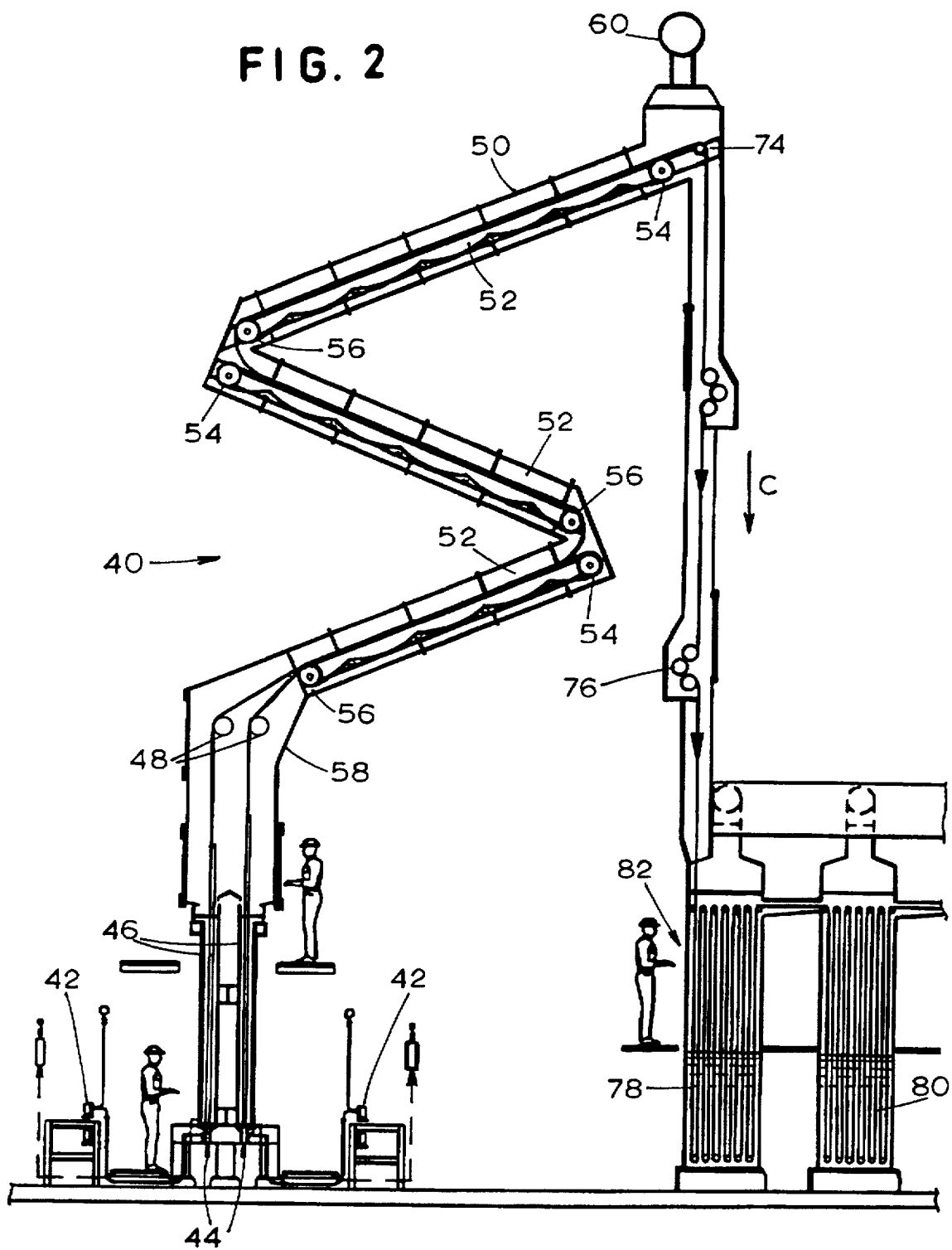
FIG. 2 generally depicts a side view of an apparatus according to the invention for cellulosic casing regeneration.

FIG. 2 presents a general depiction of an apparatus useful for practice of the methods of the invention. In this system, the casing is regenerated in the aquaria slowly using bath compositions and temperatures similar to Bridgeford, U.S. Pat. No. 4,590,107. FIG. 2 depicts a generalized viscose regeneration apparatus according to the invention (40) comprising a viscose pump (42) for extruding viscose solution through an annular die (44) at the bottom of an aquarium (46) to form a cylindrical casing. The viscose is regenerated within the aquarium (46) and is guided vertically to a premier roll (48) which is spaced a sufficient distance from the aquarium to permit a minimum of regeneration sufficient for the casing to tolerate contact with the premier roll. The casing is then directed to the casing transfer conveyor (50) comprising three upwardly moving inclined belts (52) each supported by drive sprockets (54) and idler sprockets (56). The belts are preferably formed of an open loop plastic such as polypropylene which supports the regenerating casing but allows the regeneration fluids to pass through. Preferred belts have meshes with openings of about one-half inch and include those such as Series 50 polypropylene belting produced by Falcon Belting Co. (Oklahoma City, Okla.). The belts themselves may be designed to support a single regenerating casing but are preferably designed so as to support a large plurality of regenerating casings produced from multiple aquaria. For example, as many as 18 or even 36 or more casings may be simultaneously regenerated on the belts of the invention. The inclined belts (52) are preferably disposed at an inclination between about 14° and 22° and are preferably inclined at the same inclination. The casing transfer conveyor is surrounded by an enclosure (58) vented to an exhaust (60) which protects the casing from contamination and reduces emissions of the intermediate regenerating solution which is applied to the casing.

Figure 3:
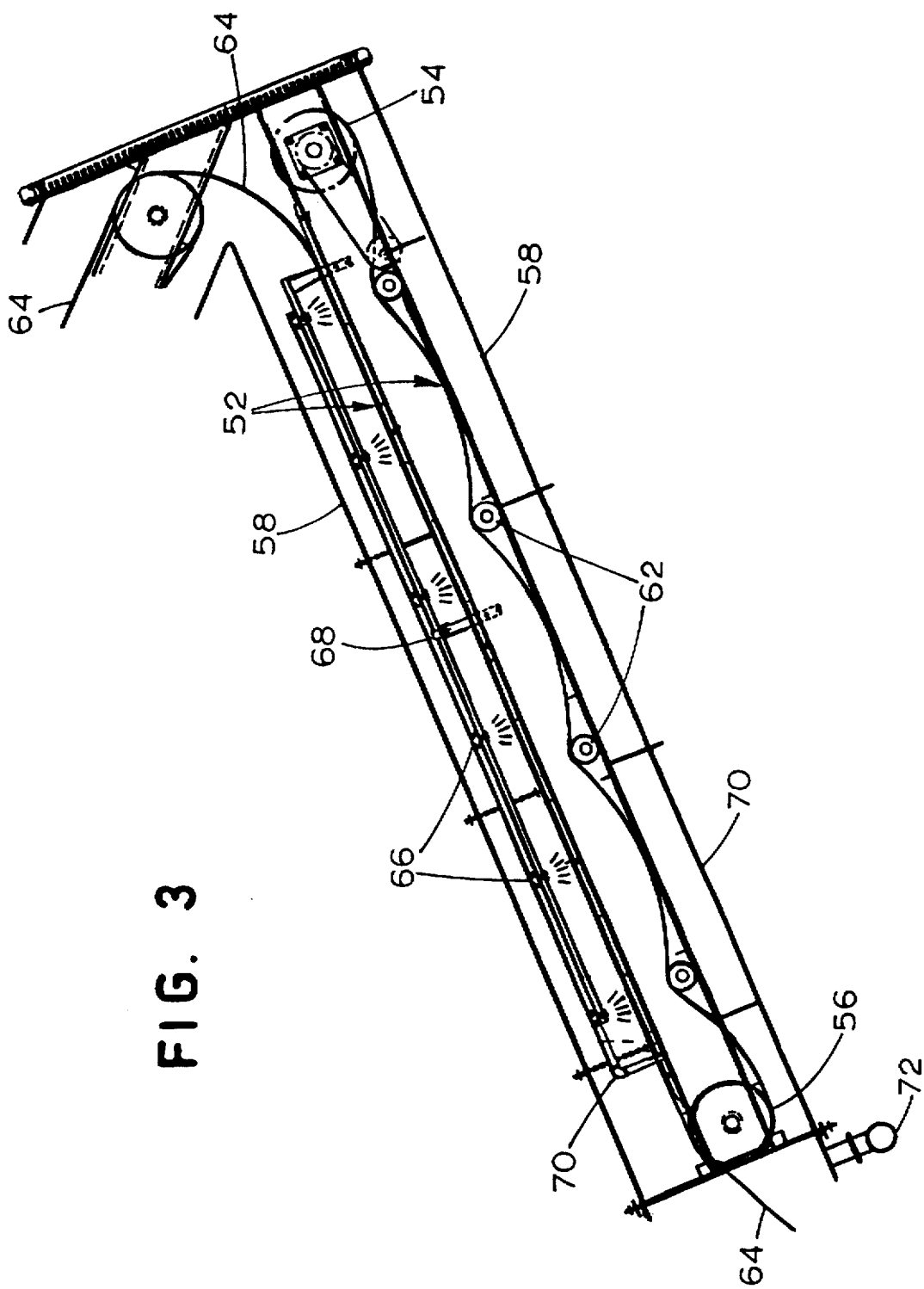
FIG. 3 depicts a detailed side view of one inclined belt according to the invention.
Figure 4:
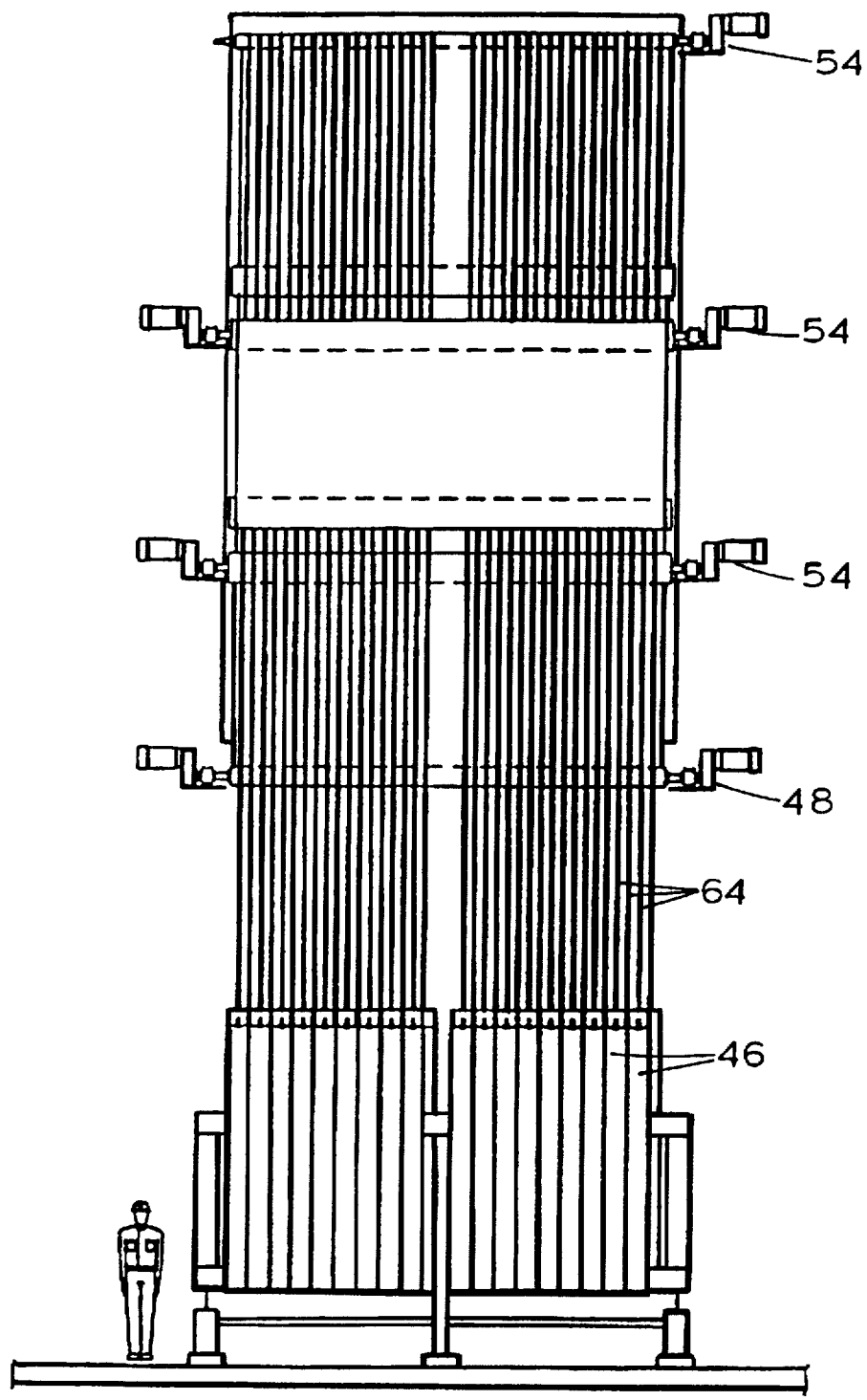
FIG. 4 depicts a front view of a battery of aquaria and inclined belts according to the invention.

FIG. 3 provides a more detailed depiction of one inclined belt of the casing transfer conveyor according to the invention. As depicted in this figure, upwardly moving inclined belt (52) is supported by a drive sprocket (54) and an idler sprocket (56) as well as by bogey sprockets (62) disposed intermediate between the drive and idler sprockets. The partially regenerated casing (64) is guided onto the lowermost portion of the inclined belt (52) by the preceding inclined belt or the premier roll (48) and is transported upward on the belt while it is sprayed with an intermediate regeneration solution from sprayers (66) on a spray manifold (68) supplied by spray manifold supply pipe (70). While FIG. 3 only depicts a cross-section of one inclined belt of the casing transfer conveyor, it is typically preferred that numerous lines of regenerating casings be processed according to the invention. According to one embodiment of the invention, a production line might comprise as many as 36 casing lines being extruded and regenerated simultaneously on one or more inclined belts being run in parallel. The casings are extruded from two banks of 18 aquaria (46) apiece where the aquaria are slightly displaced such that upon being conveyed either to the premier roll (48) or, as depicted in FIG. 2, to the first inclined belt (52) the casings from the two banks of aquaria are alternately laid side-by-side upon the belt (52) for treatment by the intermediate regenerating solution. See, for example, FIG. 4 which provides a side view of one bank of 18 aquaria (46) extruding casings (64) which are intermingled at the premier roll (48). Alternatively, the casings may be intermingled above the idler sprocket (56) at the first inclined belt (52). Thus, while spray manifold (68) might have only 6 spray nozzles applying intermediate regenerating solution to a particular casing, the manifold may supply regenerating solution to as many as 36 casings and thus 216 (6×36) spray nozzles simultaneously. Accordingly, any of a variety of spray configurations would be useful and would be apparent to those of skill in the art.

The intermediate regenerating solution is applied to the casing (64) by the spray nozzles (66) and after contacting the regenerating casing, drains through the casing and the inclined belt (52) until it is caught by catch pan (70). The regenerating solution is then directed to drain pipe (72) and the solution is either recycled for use in the casing transfer conveyor, in the aquarium or in the regeneration baths. Upon reaching the uppermost portion of the inclined belt (52), the casing (64) is drawn off of the belt (54) which returns to the bottom of the conveyor and is turned over onto its opposite side and deposited onto the next higher inclined belt above its idler sprocket (56).

The casing is thus subjected to regeneration on multiple inclined belts according to the particular methodology desired but wherein the viscose is cured to an intermediate level of regeneration characterized by a pH greater than 7 (preferably between pH 7.0 and pH 8.5 and most preferably about pH 7.5). Upon reaching the uppermost regeneration belt, the casing is then conveyed to a top roll (74) as depicted on FIG. 2. The casing then begins a downward path during which it optionally passes through a double S wrap draw roll system such as that disclosed by Atkinson U.S. Pat. No. 2,271,932 comprising two pairs of three rollers (76) which causes a final machine direction (MD) tension to be imparted into the casing to counteract the high shrinkage which occurs from slow regeneration on the belts. After passing through the double S wrap draw roll system, the casing is conveyed to chilled water bath (78) and from there to one or more acid regenerating baths (80) where its pH drops below 7.0 making the regeneration irreversible. According to a preferred embodiment of the invention, six separate acid regenerating baths (80) are used, each with different specific concentrations of regenerating solution. As is the case with conventional regenerating systems, during the course of the downward movement of the casing after reaching the top roll (74), gases and liquids are able to flow downward toward the chilled water bath (78) in the direction of arrow (C). In order that those liquids and gases be released from the interior of the casing, workers periodically puncture the casing at location (82). One advantage of the methods of the present invention, however, is that substantially less gas is evolved during the slow regeneration process resulting in the ability to puncture the casing to release evolved gas far less frequently than according to conventional methods. According to the method of the invention, the intervals between punctures in the tubing can be lengthened. While the normal frequency of puncturing is once every 800 to 1600 inches (20 to 40 meters) of casing, puncture frequency is expected to be substantially increased for casings produced according to the methods of the invention such that the frequency is expected to be about once per 4000 to 5000 meters of casing or approximately once every 90 minutes. Another benefit of the slower rate of gas bubble evolution is that the inside skin surface of the casing is smoother, allowing easier peelability later in the customer's process.

It is anticipated that numerous variations and modifications of the embodiments described above will occur to those of ordinary skill in the art when apprised of the teachings of the present specification. Accordingly, only such limitations as appear in the appended claims should be placed thereon.

What is claimed is:

1. In a method for producing tubular sausage casings of regenerated cellulose wherein viscose is extruded through an annular extrusion die submerged in an aquarium to form a tubular product and coagulation and regeneration of the tubular product is initiated in said aquarium and completed in one or more coagulation/regeneration baths, the improvement comprising partially gelling and coagulating the extruded gel tubing in the aquarium to an initial level of regeneration characterized by a pH greater than 7, supporting the partially gelled and coagulated tubing on at least two upwardly moving inclined belts such that different sides of the casing are disposed in an upward facing orientation on different said belts and applying an intermediate regenerating solution to said tubing while it is supported by said belts until it is cured to an intermediate level of regeneration characterized by a pH greater than 7 prior to completion of regeneration in said coagulation/regeneration bath wherein the viscose is cured to a level of regeneration characterized by a pH less than 7.

2. The method of claim 1 wherein the initial level of regeneration is characterized by a pH between 8.0 and 9.5.

3. The method of claim 2 wherein the initial level of regeneration is characterized by a pH of about 9.0.

4. The method of claim 1 wherein the intermediate level of regeneration is characterized by a pH between 7.0 and 8.5.

5. The method of claim 1 wherein the intermediate level of regeneration is characterized by a pH of about 7.5.

6. The method of claim 1 wherein the aquarium contains regenerating fluid characterized by a sulfuric acid concentration between 50 and 100 grams per liter and a sodium sulfate concentration between 200 and 300 grams per liter.

7. The method of claim 6 wherein the aquarium contains regenerating fluid characterized by a sulfuric acid concentration of about 75 grams per liter and a sodium sulfate concentration of about 250 grams per liter.

8. The method of claim 1 wherein said intermediate regenerating solution is characterized by a sulfuric acid concentration between 35 and 70 grams per liter and a sodium sulfate concentration between 150 and 250 grams per liter.

9. The method of claim 8 wherein said intermediate regenerating solution is characterized by a sulfuric acid concentration of about 50 grams per liter and a sodium sulfate concentration of about 200 grams per liter.

10. The method of claim 1 wherein said tubing is supported by three belts.

11. The method of claim 1 wherein the casing is extruded at a rate of 55 meters per minute or greater.

12. The method of claim 11 wherein the casing is extruded at a rate of 60 meters per minute or greater.

13. The method of claim 1 wherein said casing is characterized by a density greater than 1.6 grams per cubic centimeter.

* * * * *